United States Patent
Vaucher et al.

(10) Patent No.: US 9,547,071 B2
(45) Date of Patent: Jan. 17, 2017

(54) RADAR TRANSCEIVER

(71) Applicant: NXP B.V., Eindhoven (NL)

(72) Inventors: Cicero Silveira Vaucher, Eindhoven (NL); Cornelis Gehrels, Nijmegen (NL)

(73) Assignee: NXP B.V., Eindhoven (NL)

( * ) Notice: Subject to any disclaimer, the term of this patent is extended or adjusted under 35 U.S.C. 154(b) by 319 days.

(21) Appl. No.: 14/305,843

(22) Filed: Jun. 16, 2014

(65) Prior Publication Data

US 2015/0002328 A1 Jan. 1, 2015

(30) Foreign Application Priority Data

Jun. 26, 2013 (EP) ..................................... 13173852

(51) Int. Cl.
- G01S 7/35 (2006.01)
- G01S 13/93 (2006.01)
- G01S 7/02 (2006.01)
- G01S 13/02 (2006.01)

(52) U.S. Cl.
CPC .. *G01S 7/35* (2013.01); *G01S 7/02* (2013.01); *G01S 13/02* (2013.01); *G01S 13/931* (2013.01)

(58) Field of Classification Search
CPC .......... G01S 7/02; G01S 13/02; G01S 13/931; G01S 7/35–7/352
See application file for complete search history.

(56) References Cited

U.S. PATENT DOCUMENTS 6,114,985 A * 9/2000 Russell .................. G01S 7/4052
342/165
6,747,488 B2 * 6/2004 Nagaishi .................. G01S 7/35
327/113
6,859,750 B1 * 2/2005 Frazier ...................... H03L 7/08
702/117
8,169,358 B1 * 5/2012 Bourdelais .............. G01S 7/282
342/192
8,638,139 B2 * 1/2014 Keaveney ............. H03L 7/1976
327/156

(Continued)

FOREIGN PATENT DOCUMENTS

DE 18 2004 851276 A1 1/2006

OTHER PUBLICATIONS

Maurer, L. et al. "77 GHz SiGe Based 1-15, Bipolar Transceivers for Automotive Radar, an Industrial Perspective", IEEE New Circuits Syst. Conf., pp. 257-260 (Jun. 2011).

(Continued)

*Primary Examiner* — Matthew M Barker

(57) ABSTRACT

A radar transceiver is disclosed. The radar transceiver includes a computing unit, a sweep control unit, a set of transmitters for transmitting radar chirps to targets, a set of receivers for receiving reflected chirps from the targets, and a timing engine processor coupled to the set of transmitters and to the set of receivers and configured to transmit a first set of control signals. The timing engine processor receives a second set of control signals generated by the computing unit. The sweep control unit receives a first control signal and a second control signal from the timing engine processor. The first control signal indicating a start time of a chirp and the second control signal indicating a reset time for resetting the chirp. A controlled phased lock loop (PLL) generates a local oscillator signal which is inputted to transmitters and receivers.

13 Claims, 12 Drawing Sheets

(56) References Cited

U.S. PATENT DOCUMENTS

| | | | |
|---|---|---|---|
| 8,654,006 B2* | 2/2014 | Landez | G01S 7/032 342/103 |
| 2011/0122014 A1 | 5/2011 | Szajnowski | |
| 2011/0304500 A1 | 12/2011 | Himmelstoss et al. | |
| 2012/0001791 A1 | 1/2012 | Wintermantel | |

OTHER PUBLICATIONS

Saunders, D. et al. "A Single-Chip 24 GHz SiGe BiCMOS Transceiver for FMCW Automotive Radars", Proc. IEEE Radio Freq. Integr. Circuits Symp, pp. 459-462 (2009).

Hasch, J. et al. "Millimeter-Wave Technology for Automotive Radar Sensors in the 77 GHz Frequency Band", IEEE Trans. Microwave Theory Tech., vol. 60, No. 3, pp. 845-860 (Mar. 2012).

Lee, J. et al. "A Fully-Integrated 77-GHz FMCW Radar Transceiver in 65-nm CMOS Technology", IEEE J. Solid-State Circuits, vol. 45, No. 12, pp. 2746-2756 (Dec. 2010).

Feger, R. et al. "A 77-GHz FMCW MIMO Radar Based on an SiGE Single-Chip Transceiver", IEEE Trans. Microw. Theory Tech., vol. 57, No. 5, pp. 1020-1035 (May 2009).

Extended European Search Report for EP Patent Appln. No. 13173852.8 (Nov. 19, 2013).

* cited by examiner

RADAR TRANSCEIVER

CROSS-REFERENCE TO RELATED APPLICATIONS

This application claims the priority under 35 U.S.C. § 119 of European patent application no. 13173852.8, filed on Jun. 26, 2013, the contents of which are incorporated by reference herein.

FIELD OF THE INVENTION

The invention relates to a radar transceiver and to a method to operate such a transceiver.

BACKGROUND OF THE INVENTION

Radar sensors featuring high angular resolution normally rely on large antenna apertures. This can be achieved with the use of a dielectric lens in front of a small number of antenna elements, or with a large number of receiving (RX) elements in a phased array configuration as e.g. Bosch LRR3. Lens-antenna based techniques have the disadvantage of a small angular field-of-view of +10 degrees, making this approach less suitable for short- and middle-range radar applications where a larger field of view is required i.e. larger than ±60° degrees. In the following description the term RX is used to indicate a receiver and the term TX is used to indicate a transmitter, together with their plural forms RXs and TXs, respectively.

The large RX antenna array, on the other hand, leads to a large sensor physical size which is a drawback in many practical circumstances e.g. placement behind the bumper, etc.

It has been shown that the application of Multiple Input Multiple Output (MIMO) techniques that combines a relatively small number of RXs e.g. 4 with a small number of TXs e.g. 4 [Feger-2009 'A 77-GHz FMCW MIMO Radar Based on an SiGe Single-Chip Transceiver', Reinhard Feger et al., IEEE TRANSACTIONS ON MICROWAVE THEORY AND TECHNIQUES, MAY 2009, pp. 1020-1035] provides a larger "effective" receiving aperture, effectively the aperture of 16 receiving antennas, without the drawbacks mentioned above, meaning that the field of view is kept relatively large and the physical size is comparable to a small array of 4 RXs. The MIMO technique described above works by sequentially switching the TXs while the RXs acquire and store data, so that a set of measurements for all combinations of TX and RX antennas is obtained after the data acquisition cycle completes [TX1, RX1, RX2, . . . ], [TX2, RX1, RX2, . . . ]. The radar processing is then completed by post-processing the set of measured results for the different TX1, . . . , TXn possibilities.

An alternative technique for MIMO radar signal acquisition and processing is described in US2012/0001791 and it is shown in FIG. 1. In this application the phase of a TX path TX0 is binary toggled from chirp to chirp, whereas the phase of the second TX path TX1 is kept constant from chirp to chirp. The data acquisition process is simultaneous for TX0 and TX1, instead of sequential as in the method proposed by Feger. The phase toggling in path TX0 allows the signal from the two TXs antennas to be separated in subsequent signal processing steps.

Throughout this disclosure, a chirp is considered to be the sweep signal generated by the radar.

In FIG. 2 a generic MIMO radar system is shown. The system comprises a radar IC on the left hand side and a microcontroller/Digital Signal Processing (uC/DSP). The radar IC is able to perform MIMO data acquisition according to the above-mentioned techniques. The radar IC contains three independently-controlled transmitters TX1, . . . , TX3, four receivers RX1, . . . , RX4 and a waveform generator 8 providing for a flexible chirp control. Each receiver includes a 12 bit Successive Approximation (SAR) ADC and a data serializer for transferring data to an external DSP chip for further processing either in real time operation mode, or into a data capturing mode for offline processing. The interface to the uC/DSP consists of

- four high-speed serial lines (ADC1, . . . , ADC4) containing the ADC data;
- an SPI communication bus; and
- two additional control lines Window active and Ready INT indicating the state of the data acquisition cycle to the micro-controller.

The Window active signal and the Ready INT signal are generated by a timing engine 1. Furthermore, the Data Received Via the SPI Communication Bus is Stored in an SPI Register 7.

In FIG. 3, a typical data acquisition cycle is presented. Before the chirp sequence starts, the RXs and TXs are in an Idle state, meaning that the system is in a power-down mode in order to save the power consumption. After starting the chirp sequence, the front-end elements are activated i.e. enabled, using a specific set of control signals values for the TX1, . . . , TXn stages. One may observe that there are two levels of on/off control for the TX sections. It is an enable function to control full-power down of the active circuitry, in addition to an on-off switch that effectively suppresses the output signal when the power amplifiers are in active state. The reason for this double control is to avoid large supply voltage transient states during the data acquisition cycle. Supply voltage disturbances created by the on-off switch are reasonable small because the DC current flowing in the TX sections is kept almost constant.

The signals controlling each TX consist of the state of the on-off switch i.e. 1/0 bits, and the state of the binary phase shifter. In FIG. 3, it is indicated that the states of the TXs sections change for the second chirp in the sequence, and so on until the data acquisition cycle is completed. Typical data acquisition cycles consist of 128, 256, 512, up to 1024 chirps.

In FIG. 3, control parameters for the frequency chirp itself, are shown too. They are the start and stop frequencies, dwell time and settle time parameters, a time allocated for collecting of valid ADC samples Window active, a time for indicating to local oscillator to return to the start frequency, and finally an overall parameter Tchirp indicating the overall time length of each acquisition chirp.

In general, a Frequency Modulated Continuous Wave (FMCW) radar data acquisition cycle in the context of this application consists of a sequence of frequency chirps with precise timing, as depicted in FIG. 3. Additionally, for MIMO data acquisition systems, the settings for the TXs active states and/or the state of the phase shifters in each TX can change from chirp to chirp, as described e.g. in Feger-2009 and US2012/0001791.

Without a dedicated control block within the radar front-end chip, the timing of the frequency chirps as well as chirp-to-chirp changes need to be controlled via SPI transactions from the uC towards the radar IC. This is undesirable, because:

SPI communications are in general not suitable for precise timing of functional operations, because the generation of control strings relies on software routines running inside the micro-controller;

SPI response may have a relatively large latency due to message header overhead, and SPI bus activity during communication can disturb sensitive portions of the radar IC during the data acquisition cycle.

For a precise and reliable data acquisition cycle, it is therefore important that the process of complete acquisition sequence does not depend on SPI communications.

SUMMARY OF THE INVENTION

Hence, it is a need for an improved radar system.

It is therefore an object of the invention to provide a radar transceiver system comprising a set of transmitters for transmitting radar chirps to targets, a set of receivers for receiving reflected chirps from the targets, a timing engine coupled to the set of transmitters and to the set of receivers and adapted to transmit a first set of control signals to the set of transmitters and to the set of receivers, the timing engine being further coupled to a computing unit, the timing engine being adapted to receive a second set of control signals generated by the computing unit and transmitted via a bus, a sweep control unit coupled to the timing engine and adapted to receive a first control signal and a second control signal from the timing engine, the first control signal indicating a start time of a chirp and the second control signal indicating a reset time for resetting the chirp, the sweep control unit being further coupled to a controlled Phase Locked Loop (PLL) adapted to generate a local oscillator signal which is adapted to be inputted to both each member of the set of transmitters and each member of the set of receivers.

In this way, the chirps generation is precisely controlled by the timing engine and the chirps are generated by the PLL under the direct control of the sweep control unit. Hence, the use of the SPI is avoided in the acquisition mode and the chirps are generated with a more precise timing control.

In an embodiment, each receiver included in the set of receivers comprises an Analog to Digital Converter coupled to a serializer and adapted to digitize the reflected chirps and to send digitized reflected chirps serially, each receiver being activated for period of time determined by a signal generated by the timing engine under the control of another signal generated by the timing engine.

In accordance with another aspect of the application, the timing engine comprises an interface adapted to receive the second set of control signals transmitted by the computing unit, a control register adapted to store the control signals and to transmit control signals to a sequencer, the sequencer generating the third set of control signals for controlling the sweep control unit. The interface may be an SPI one but other serial or parallel interfaces should not be excluded.

In an embodiment the timing engine further comprises a first register, a second register and a third register coupled to a Multiplexer circuit, each register comprising parameter settings for selected chirps that are generated by the set of transmitters, the multiplexer circuit being controlled by a signal generated by the sequencer for selecting which of the first, second or third registers content is transmitted.

In another embodiment, the timing engine further comprises a fourth register adapted to load the content outputted by the multiplexer circuit for preventing accidental transmission of chirp parameters.

In accordance with another aspect of the application, the sequencer comprises a first counter, a second counter and a third counter, each counter being adapted to be reset, or to increment their content under the control of the third counter.

In an embodiment of the application the sweep control unit comprises a plurality of registers adapted to be loaded via a bus, a frequency divider controlled by a first register from the plurality of registers, a circuitry implementing a state—machine which is controlled by the control signals from the timing engine, the signals indicating a start time of a chirp and a reset time for resetting the sweep control unit, the sweep control unit generating the control signals which controls the Phase Locked Loop (PLL). The bus maybe an SPI bus but other types of buses should not be excluded. The buses may be arranged to transfer data either serially or parallely.

In an embodiment of the application, the Phase Locked Loop (PLL) comprises a phase-frequency detector coupled to a charge pump, the charge pump being coupled to a loop filter, the loop filter being further coupled to a voltage-controlled oscillator (VCO), the voltage controlled oscillator being adapted to generate the local oscillator signal, the voltage control-oscillator being coupled to a divider which is controlled by the control signals generated sweep control unit, a control register adapted to be updated via the SPI bus, the control register being adapted to control parameters of the charge pump, loop filter and voltage control oscillator.

Preferably, the transceiver is adapted to be mounted on a vehicle.

It is also presented a method for transmitting and receiving radar signals comprising steps of:

transmitting chirps to a set of transmitters for transmitting them to targets;

receiving reflected chirps from the targets by a set of receivers;

transmitting a first set of control signals generated by a timing engine coupled to the set of transmitters and to the set of receivers, the timing engine being further coupled to a computing unit for receiving a second set of control signals information via a bus;

receiving a third set of control signals from the timing engine by a sweep control unit, the control signals indicating a start time of a chirp and a reset time for resetting the chirp;

generating a local oscillator signal by a controlled PLL coupled to the sweep control unit.

In an embodiment, the method further comprises steps of:

analog to digital converting and serializing the reflected chirps by any receiver in the set of receivers, activating each receiver in the set of receivers by a signal generated by the timing engine for a period of time determined by another signal (Windows active) generated by the timing engine.

In another aspect of the application, the method further comprises steps of:

receiving the second set of control signals transmitted by the computing unit by the timing engine in a dedicated register;

transferring the received control signals in a control register adapted to store the control signals;

transmitting control signals from the control register to a sequencer;

generating the third set of control signals by the sequencer for controlling the sweep control unit.

The method may further comprise steps of:
loading chirp parameters settings in a first register, a second register and a third register coupled to a Multiplexer circuit, and included in the timing engine,
controlling the multiplexer circuit by a signal generated by the sequencer for selecting which of the chirp parameters settings are transmitted.

The invention is defined by the independent claims. Dependent claims define advantageous implementations.

BRIEF DESCRIPTION OF THE DRAWINGS

The above and other advantages will be apparent from the exemplary description of the accompanying drawings in which.

DESCRIPTION OF THE EMBODIMENTS

Figure 1:
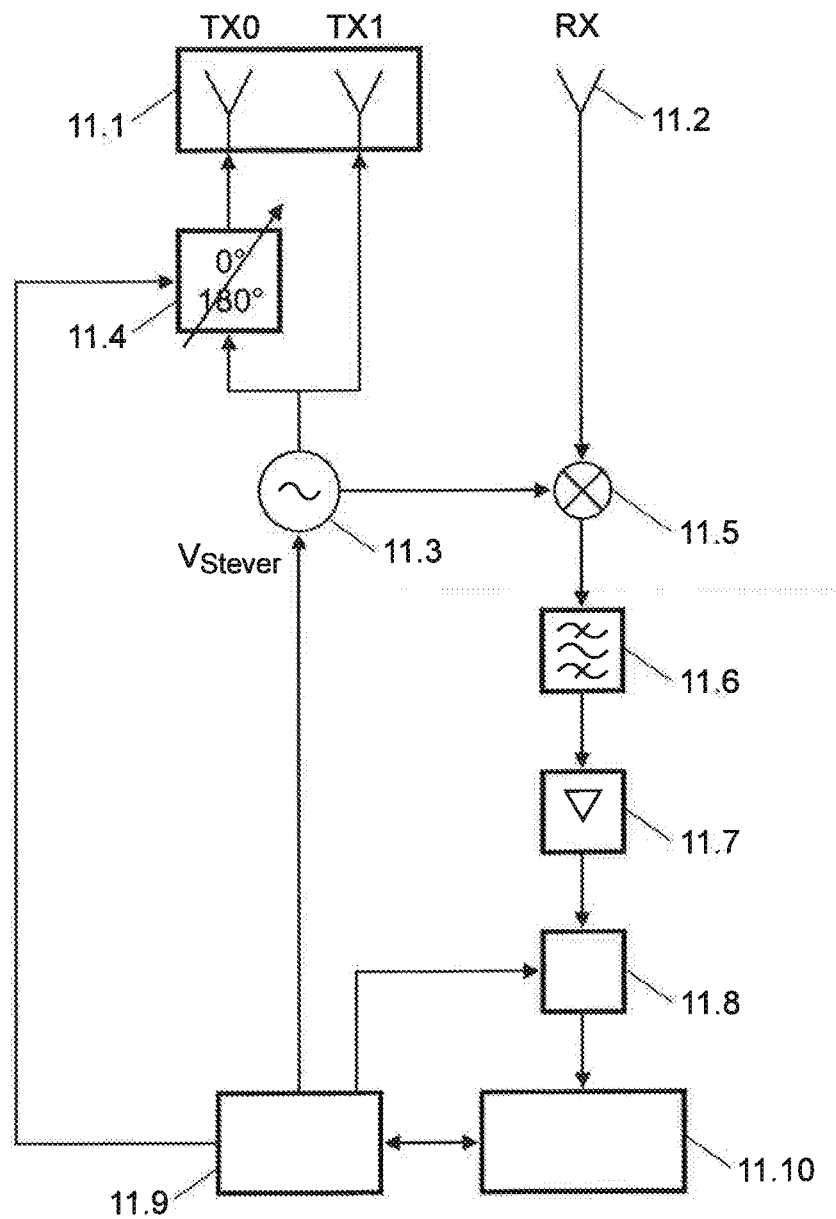
FIG. 1 depicts a prior art chirp acquisition system.
Figure 2:
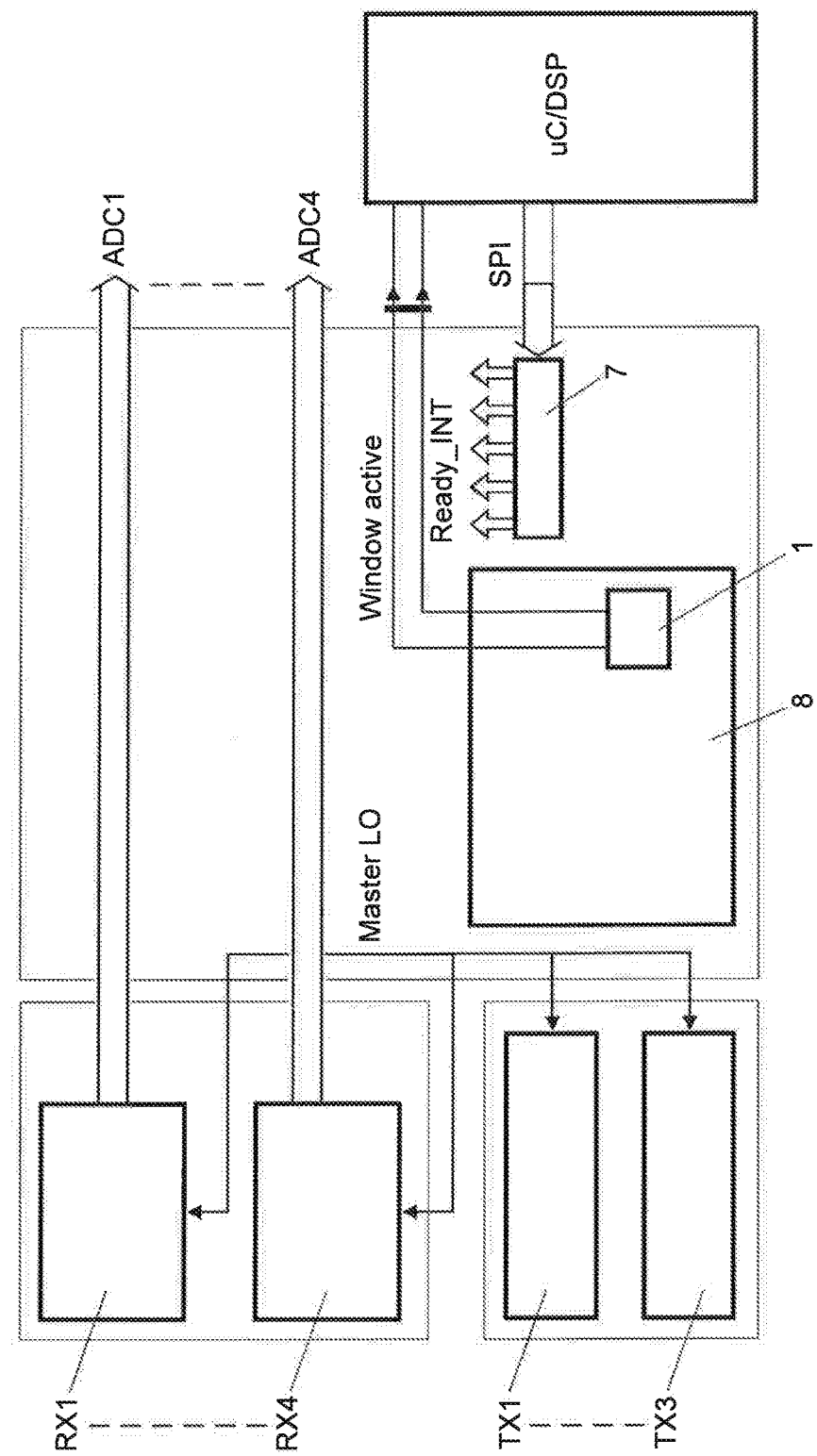
FIG. 2 depicts an example of a MIMO radar system.
Figure 3:
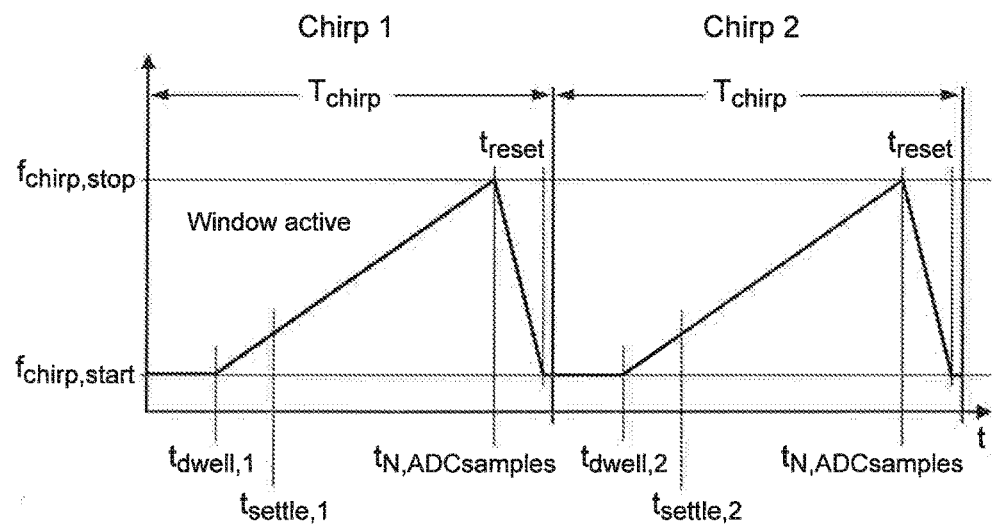
FIG. 3 depicts a typical timing sequence for chirp generation in a radar system.
Figure 4:
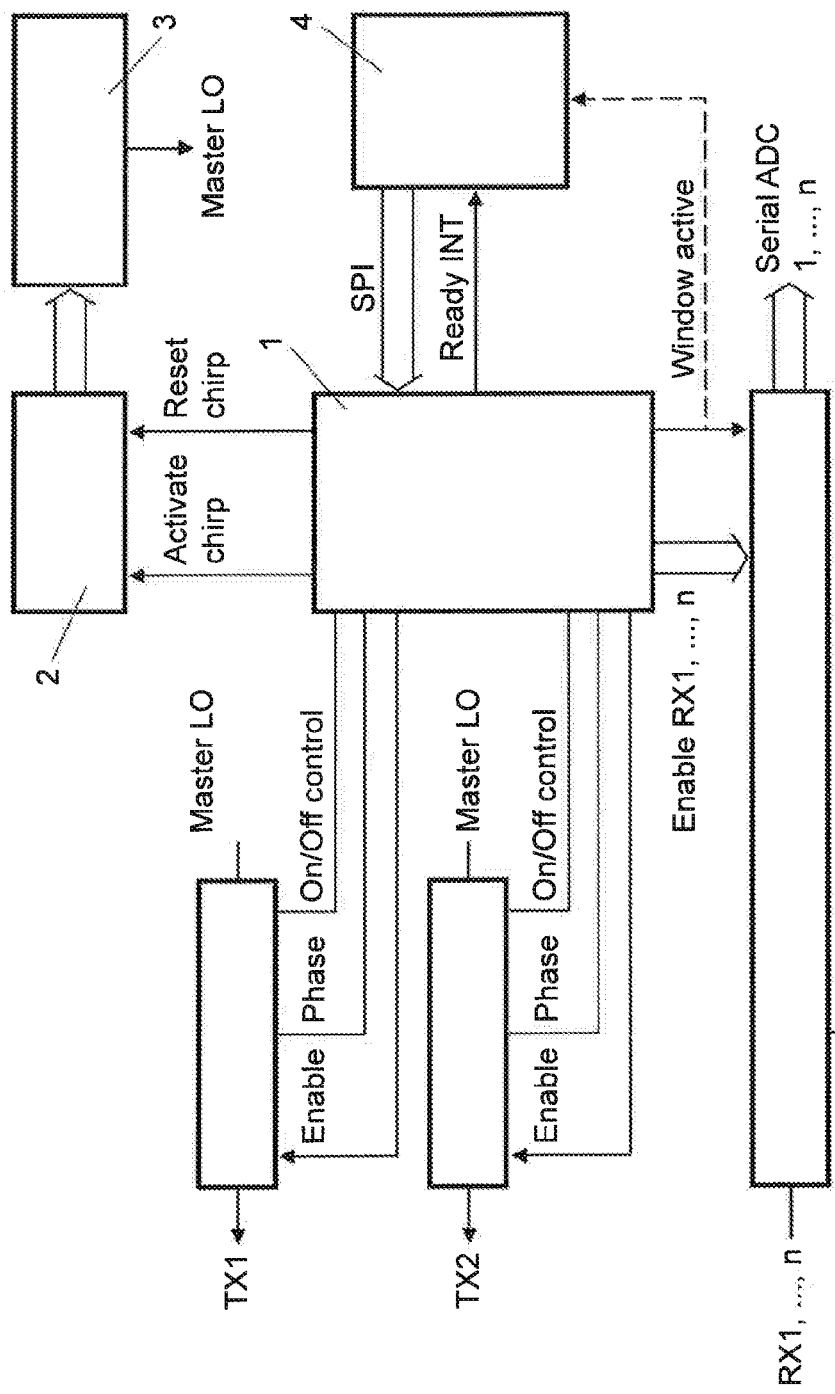
FIG. 4 depicts a radar system according to an aspect of the application.

FIG. 4 depicts a radar system according to an aspect of the application. The radar system comprises a set of transmitters TX1, . . . , TXn for transmitting radar chirps to targets, a set of receivers RX1, . . . , RXn for receiving reflected chirps from the targets and a timing engine 1 coupled to the set of transmitters TX1, . . . , TXn and to the set of receivers RX1, . . . , RXn. The timing engine 1 is adapted to transmit a first set of control signals to the set of transmitters TX1, . . . , TXn and to the set of receivers RX1, . . . , RXn. The timing engine 1 is further coupled to a computing unit 4, the timing engine 1 being adapted to receive a second set of control signals generated by the computing unit 4 and transmitted via a bus. The radar system further comprises a sweep control unit 2 coupled to the timing engine 1 and adapted to receive a first control signal and a second control signal from the timing engine 1, the first control signal indicating a start time of a chirp and the second control signal indicating a reset time for resetting the chirp. The sweep control unit 2 is further coupled to a controlled Phase Locked Loop (PLL) 3 adapted to generate a local oscillator signal Master LO which is adapted to be inputted into both each member of the set of transmitters TX1, . . . , TXn and each member of the set of receivers RX1, . . . , RXn.

It is observed that the radar IC contains functional elements controlling the timing of the chirp sequence, as well as the functional state of the TX sections on a chirp-to-chirp basis, without the need of the bus interactions during the data acquisition cycle. Recall that the bus may be an SPI one but other buses should not be excluded.

The central control element is the timing engine 1, which interacts with the computing unit by means of an SPI bus and a Ready INT signal. The computing unit may be a microcontroller. The timing unit 1 generates control signals for the sweep unit 2. The control signals determine a precise start time for generating the frequency chirp, and a precise time for resetting the frequency chirp. This PLL-based solution avoids difficulties associated with open-loop chirp generation techniques, e.g. using a Digital to Analog Converter in combination with a VCO, which require accurate and frequent calibration of the VCO. In this case, the calibration becomes inaccurate for example if the chip temperature during the data acquisition cycle is different from the temperature during the VCO calibration cycle.

The timing unit 1 is interfaced with each TX by means of three signals: "Enable" for power-up control and idle mode setting, "Phase" for control of the phase shifters situated in each transmitter TX, and "On/Off control" for fast suppression of the output signal. This signal is useful for MIMO control and for suppressing the risk of "out-of-band" signals, for example during undershoot transients of the Master LO when returning to the chirp start frequency. The timing engine 1 is further interfaced with the RX paths via Enable signals for power-up control and idle mode setting, similar to the TX stages, and a Window active signal indicating the time interval allocated for effective data acquisition by the ADCs within each RX path. The timing engine 1 uses a clock signal for derivation of precise time intervals.

Figure 5:
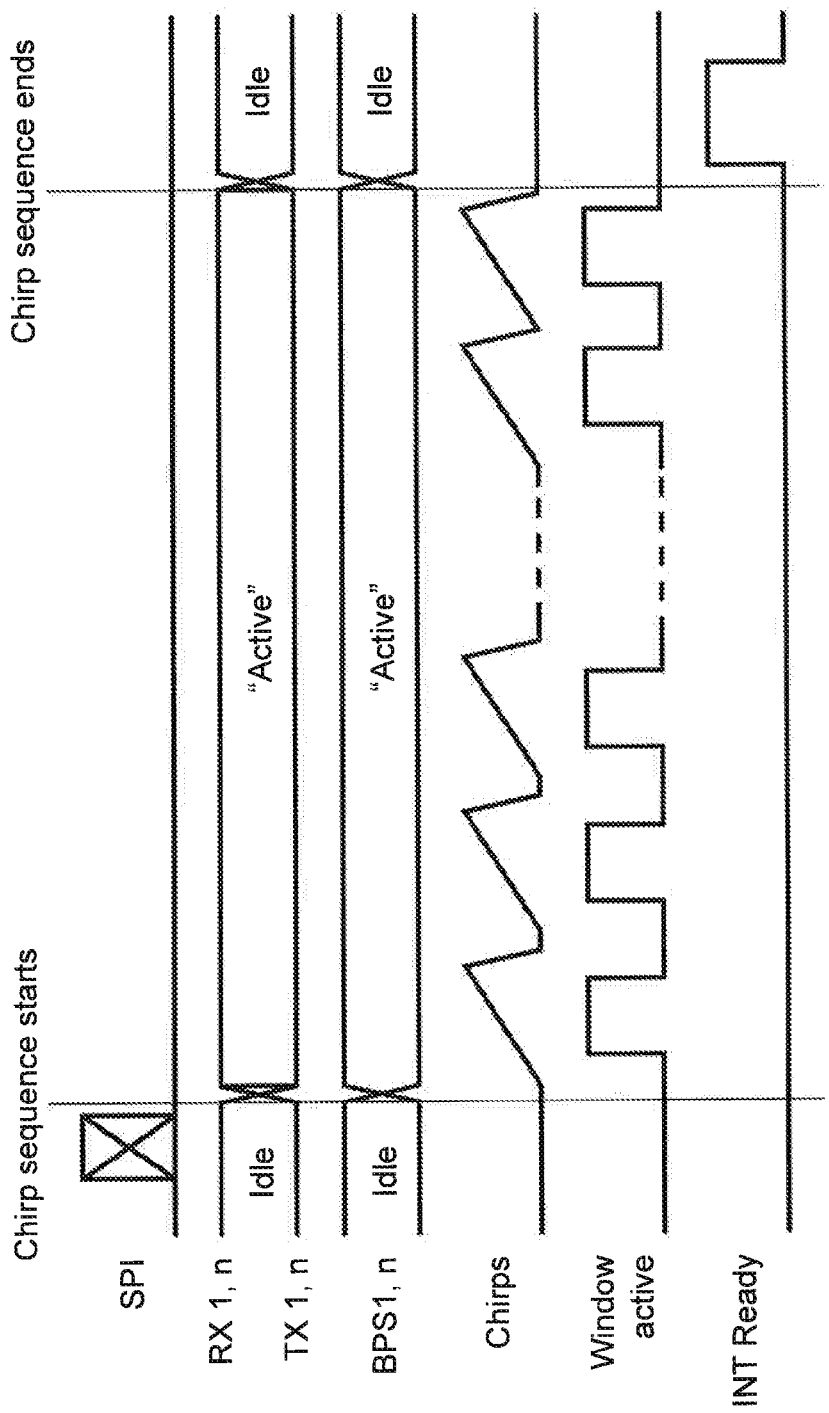
FIG. 5 depicts a complete data acquisition sequence for a radar system.

FIG. 5 depicts a complete data acquisition sequence for a radar system. Before the chirp sequence starts, there is an SPI communication from the microcontroller to the timing engine registers, setting functional parameters for the chirp sequence. A measurement sequence is triggered by setting an appropriate code in the Control register e.g. bit 0 of control word stored within Control register, and sent via SPI, too.

The timing engine 1 controls the functional state of the RX and TX sections during the "idle" period i.e. between data acquisition operations. The timing engine also control the setting of the phase shifters which are included in the TXs e.g. during a power down operation. The total number of chirps in a data acquisition sequence is programmable. Within each chirp, the timing from the start of the frequency ramp to the start of data acquisition from the ADCs is precisely controlled, by means of the Window active signal. It should be observed that the ADCs sample continuously the incoming signals, but data points are not transferred into the output serializer if they are outside the active period of the Window active signal.

After the last chirp in the sequence, the timing engine 1 communicates a Ready Interrupt signal to the microcontroller, signaling the end of the measurement cycle. In addition, the Idle state register 95 settings are again to the front-end sections, indicating e.g. entering into a power-down mode for save power dissipation.

Figure 6:
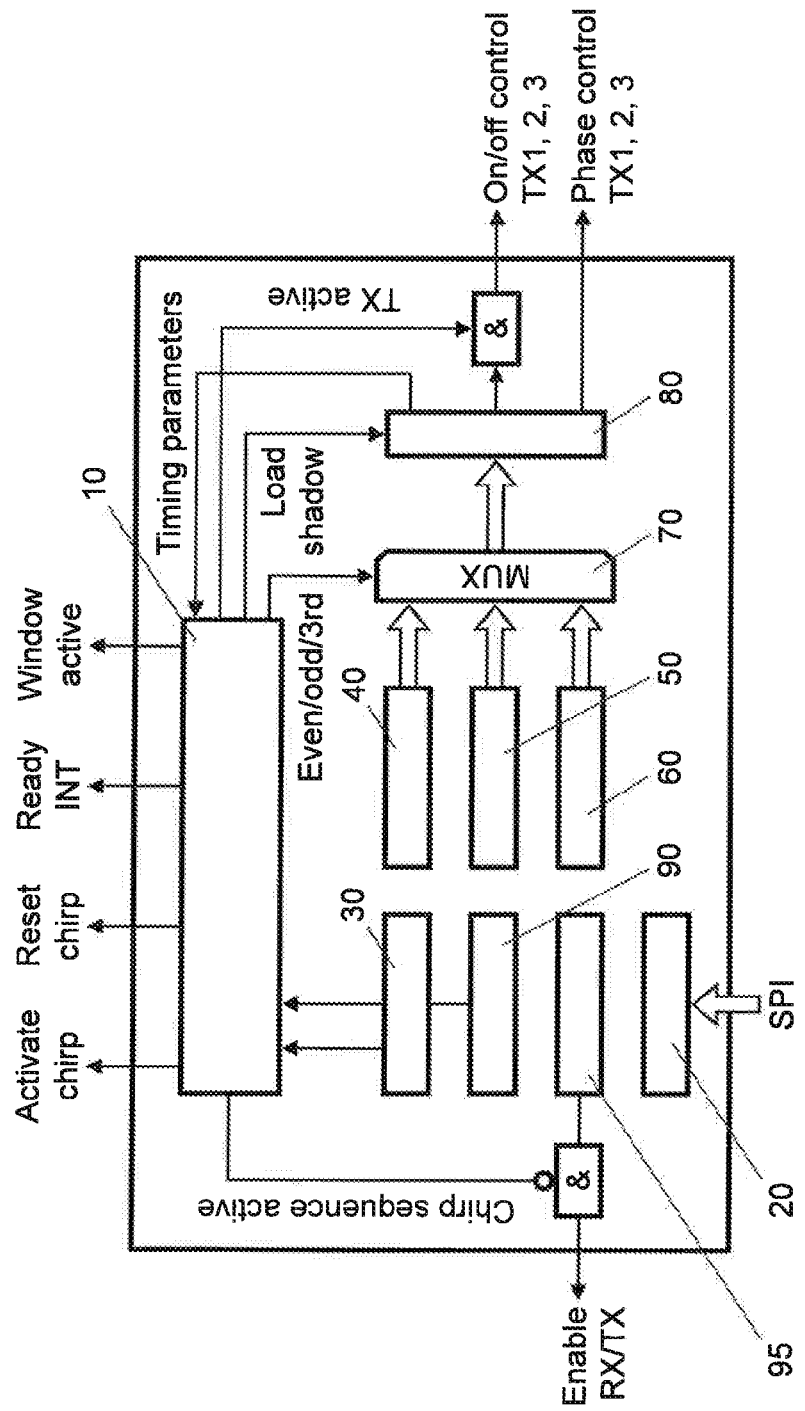
FIG. 6 depicts a more detailed view of the timing engine according to an embodiment of the application.

FIG. 6 depicts a more detailed view of the timing engine according to an embodiment of the application. The timing engine 1 comprises an interface 20 adapted to receive the second set of control signals transmitted by the computing unit 4. It further comprises a control register 30 adapted to store the control signals and to transmit control signals to a sequencer 10, the sequencer 10 generating the third set of control signals i.e. Activate chirp and Reset Chirp in order to control the sweep control unit 2. The timing engine 1 also includes a first register 40, a second register 50 and a third register 60 coupled to a Multiplexer circuit 70, each register comprising parameter settings for selected chirps that are generated by the set of transmitters TX1, . . . , TXn. The multiplexer circuit 70 is controlled by a signal generated by the sequencer 10 for selecting which of the first, second or third register content is transmitted. The timing engine 1 further comprises a fourth register 80 adapted to load the content outputted by the multiplexer circuit 70 and preventing accidental changes in front-end parameters while the frequency chirp is processed. The sequencer 10 comprises a first counter CNchirp, a second counter CNADC and a third counter CTchirp, each counter being adapted to be reset and to increment their content under the control of the third counter CNchirp. The second counter CNADC is controlled by the third counter CTchirp.

The sequencer 10 receives input data from the Control register 30, Data acquisition register 90 and from the first, second and third register, which are labeled for convenience as Odd register, Even register and 3-rd register, respectively.

acquisition chirp, so that each and every chirp may have different timing parameters. This operation is correct as long as the SPI update of the Timing register content does not coincide with the beginning of a chirp, when the registers contents are transferred into the Shadow register. The "Window active" signal can be used by the MCU to ensure proper timing of the SPI update.

Table 1 below shows a typical operation mode in Mode 1. In this case, only TX1 is used for data acquisition during the complete cycle.

Let us note that the Idle state register 95 is used to keep TX2 and TX 3 disabled during the acquisition cycle. The value of the Enable TX1, . . . , RX1, . . . , n word during acquisition reflects the content of the Idle state register 95.

It is possible that in practice a sequence of TX 1 measurements is followed by a sequence of TX2 measurements, in that case SPI communication is used, after the first acquisition cycle with TX1 is completed, to update the contents of the Idle state register 95 to [0, 1, 0], and so on for a measurement with TX3.

TABLE 1

Illustrative signals for Mode 1 operation

| | Enable TX1, TX2, TX3 | Enable RX1, . . . , n | On/Off TX1 | Phase TX1 | On/Off TX2 | Phase TX2 | On/Off TX3 | Phase TX3 |
|---|---|---|---|---|---|---|---|---|
| Idle | 0, 0, 0 | 0, 0, 0, 0 | x | x | x | x | x | x |
| Chirp 1 | 1, 0, 0 | 1, 1, 1, 1 | 1 | 0 | x | x | x | x |
| Chirp 2 | 1, 0, 0 | 1, 1, 1, 1 | 1 | 0 | x | x | x | x |
| Chirp 3 | 1, 0, 0 | 1, 1, 1, 1 | 1 | 0 | x | x | x | x |
| Chirp 4 | 1, 0, 0 | 1, 1, 1, 1 | 1 | 0 | x | x | x | x |
| .... | | | | | | | | |

In operation mode 2, which is described further, the Odd register contains parameter setting for the $1^{st}$ chirp in the sequence, the $3^{rd}$, the $5^{th}$ and so on. The Even register contains parameters setting for the $2^{nd}$, the $4^{th}$, the $6^{th}$ chirps in the sequence, etc. The 3-rd register allows an additional operation mode for a sequence of three different chirp parameters in an acquisition sequence. The modes are described in more detail below.

Mode 1 Single register operation. This mode is used for measuring sequences with identical parameters from chirp to chirp. The content of the Odd register is transferred into a shadow register i.e. the fourth register 80 when the "Load shadow" signal becomes active. The "Load shadow" operations are simultaneous at the start of the measurement sequence and at the end of each chirp.

The "shadow register" is also useful in Mode 1 operation, when the content of the Odd register is updated during an Mode 2: Odd/Even register operation. This mode is used for radar MIMO operation with two alternating parameter sets for chirps in the sequence. In this mode, the parameters are written into the Odd and Even registers before the data acquisition starts. During data acquisition, the sequencer selects the Odd/Even register contents in an alternate way for each chirp in the sequence; this addressing operation is done by using the multiplexer 70 in a conventional manner.

Table 2 shows signals in Mode 2(a) of operation in which TX1 and TX2 are simultaneously active, and the phase of TX2 is toggled on a chirp to chirp basis. This is a MIMO operation. The settings for Chirp 1, 3, . . . are input into the Odd register, and settings for chirp 2, 4, . . . into the Even register.

TABLE 2

Illustrative signals for Mode 2(a) operation with TX 1 and TX 2 simultaneously active, with the phase of TX2 toggled on a chirp to chirp basis.

| | Enable TX1, TX2, TX3 | Enable RX1, . . . , n | On/Off TX1 | Phase TX1 | On/Off TX2 | Phase TX2 | On/Off TX3 | Phase TX3 |
|---|---|---|---|---|---|---|---|---|
| Idle | 0, 0, 0 | 0, 0, 0, 0 | x | x | x | x | x | x |
| Chirp 1 | 1, 1, 0 | 1, 1, 1, 1 | 1 | 0 | 1 | 0 | x | x |
| Chirp 2 | 1, 1, 0 | 1, 1, 1, 1 | 1 | 0 | 1 | 1 | x | x |
| Chirp 3 | 1, 1, 0 | 1, 1, 1, 1 | 1 | 0 | 1 | 0 | x | x |
| Chirp 4 | 1, 1, 0 | 1, 1, 1, 1 | 1 | 0 | 1 | 1 | x | x |
| .... | | | | | | | | |

An alternative way to operate in Mode 2 is depicted in Table 3 below. In this case TX1 and TX2 are not simultaneously active; TX1 is active in odd numbered chirps, and TX2 is active in even numbered chirps.

The moment for up-dating the Odd/Even/3rd pointer coming from the sequencer to ensure proper timing of "latching operation" within the sequencer at the start of each chirp as described above, is done simultaneously with the chirp reset signal, as it will be described further in the application.

TABLE 3

Illustrative signals for Mode 2(b) operation with TX 1 and TX 2 alternately active on a chirp-to-chirp basis.

| | Enable TX1, TX2, TX3 | Enable RX1, ..., n | On/Off TX1 | Phase TX1 | On/Off TX2 | Phase TX2 | On/Off TX3 | Phase TX3 |
|---|---|---|---|---|---|---|---|---|
| Idle    | 0, 0, 0 | 0, 0, 0, 0 | x | x | x | x | x | x |
| Chirp 1 | 1, 1, 0 | 1, 1, 1, 1 | 1 | 0 | 0 | 0 | x | x |
| Chirp 2 | 1, 1, 0 | 1, 1, 1, 1 | 0 | 0 | 1 | 0 | x | x |
| Chirp 3 | 1, 1, 0 | 1, 1, 1, 1 | 1 | 0 | 0 | 0 | x | x |
| Chirp 4 | 1, 1, 0 | 1, 1, 1, 1 | 0 | 0 | 1 | 0 | x | x |
| ....    |         |            |   |   |   |   |   |   |

Mode 3: Odd/Even/3rd register operation. This mode is similar to Mode 2 above. However the repeating sequence is based on three instead of two timing registers. In this mode each one of the three TX stages can be alternately activated during a chirp, for example. The sequencer addresses each one of the three register in sequence.

An example for Mode 3 operation is presented in Table 4. TX1, TX2, and TX3 are activated successively on subsequent chirps. Chirp 1 parameters are loaded in the Odd register, Chirp 2 parameters are loaded in the Even register, and Chirp 3 parameters are loaded in the $3^{rd}$ register. The chirps sequence repeats after every three chirps with Chirp 4 equal to Chirp 1, Chirp 5 equal to Chirp 2, and so on.

TABLE 4

Illustrative signals for Mode 3 operation with TX 1 and TX 2 alternately active on a chirp-to-chirp basis.

| | Enable TX1, TX2, TX3 | Enable RX1, ..., n | On/Off TX1 | Phase TX1 | On/Off TX2 | Phase TX2 | On/Off TX3 | Phase TX3 |
|---|---|---|---|---|---|---|---|---|
| Idle    | 0, 0, 0 | 0, 0, 0, 0 | x | x | x | x | x | x |
| Chirp 1 | 1, 1, 1 | 1, 1, 1, 1 | 1 | 0 | 0 | 0 | 0 | 0 |
| Chirp 2 | 1, 1, 1 | 1, 1, 1, 1 | 0 | 0 | 1 | 0 | 0 | 0 |
| Chirp 3 | 1, 1, 1 | 1, 1, 1, 1 | 0 | 0 | 0 | 0 | 1 | 0 |
| Chirp 4 | 1, 1, 1 | 1, 1, 1, 1 | 1 | 0 | 0 | 0 | 0 | 0 |
| ....    |         |            |   |   |   |   |   |   |

Figure 8:
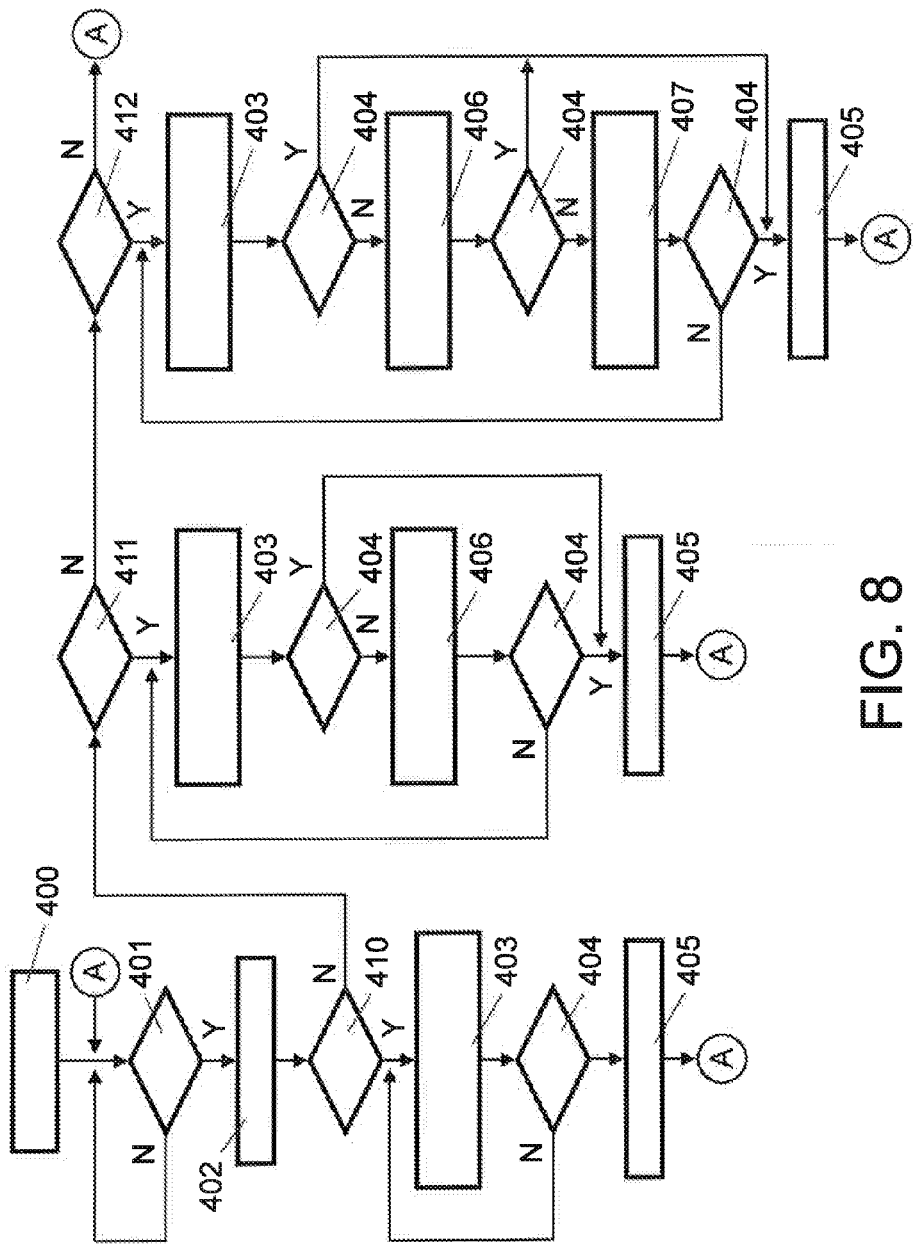
FIG. 8 depicts a flowchart showing the operating modes of the timing engine, according to an embodiment of the application.

FIG. 8 depicts a flowchart showing the operating modes of the timing engine, according to an embodiment of the application. The main flow-control parameters are the Mode variable 410, 411 and 412, the chirp counter $CN_{chirp}$ and the number of chirps on a complete acquisition sequence $N_{chirp}$.

The process depicted in the flowchart starts with the initialization of the registers in step 400. Then a decision whether the process will start is taken in block 401. If the decision is Yes i.e. Y then the chirp counter CNchirp is reset in step 402. If the answer is No i.e. N then the system stays in the point A of the flowchart.

A specific mode of operation is selected in block 410, for Mode 1, in block 411 for Mode 2 and in block 412 for Mode 3.

If Mode 1 is selected, then in block 403 the following operations are performed:
the Odd register is selected
a single chirp data acquisition is performed, and
$CN_{chirp}$ counter is incremented by one.

In block 404 the content of $CN_{chirp}$ is compared with $N_{chirp}$. If it is smaller than Nchirp then the operation repeats until $CN_{chirp}$ equals $N_{chirp}$ i.e. following the N branch. If CNchirp=Nchirp then the Interrupt ready signal is activated in block 405. The Interrupt ready signal indicates the completion of the acquisition sequence by the microcontroller, and the process returns to the point A in the flowchart.

If Mode 2 is selected in block 411, then the operations described above in block 403 are performed, followed by the decision 404. If it CNchirp is smaller than Nchirp then The even register is selected in block 406. In the same block, a single chirp data acquisition is performed and $CN_{chirp}$ counter is incremented by one. Again in the block 404 the content of $CN_{chirp}$ is compared with $N_{chirp}$. If it is smaller than Nchirp then the operation repeats until $CN_{chirp}$ equals $N_{chirp}$ i.e. following the N branch. If CNchirp=Nchirp then the Interrupt ready signal is activated in block 405. The Interrupt ready signal indicates the completion of the acquisition sequence by the microcontroller, and the process returns to the point A in the flowchart.

In Mode 3, the odd, even and $3^{rd}$ registers are addressed in sequential fashion, with the logical flow similar to mode 1 and 2 above.

If Mode 3 is selected in block 412, then the operations described above in block 403 are performed, followed by the decision 404. In block 406 the operations described in Mode 2 are performed.

In block 407 the following operations are performed:
the 3-rd register is selected;
a single chirp data acquisition is performed, and
$CN_{chirp}$ counter is incremented by one.

In the flow chart, in similar blocks i.e. having the same reference number, similar operations are performed.

The sequencer 10 comprises a first counter CNchirp, a second counter CNADC and a third counter CTcirp, each counter being adapted to be reset, and to increment their content under the control of the third counter CNchirp.

Figure 10:
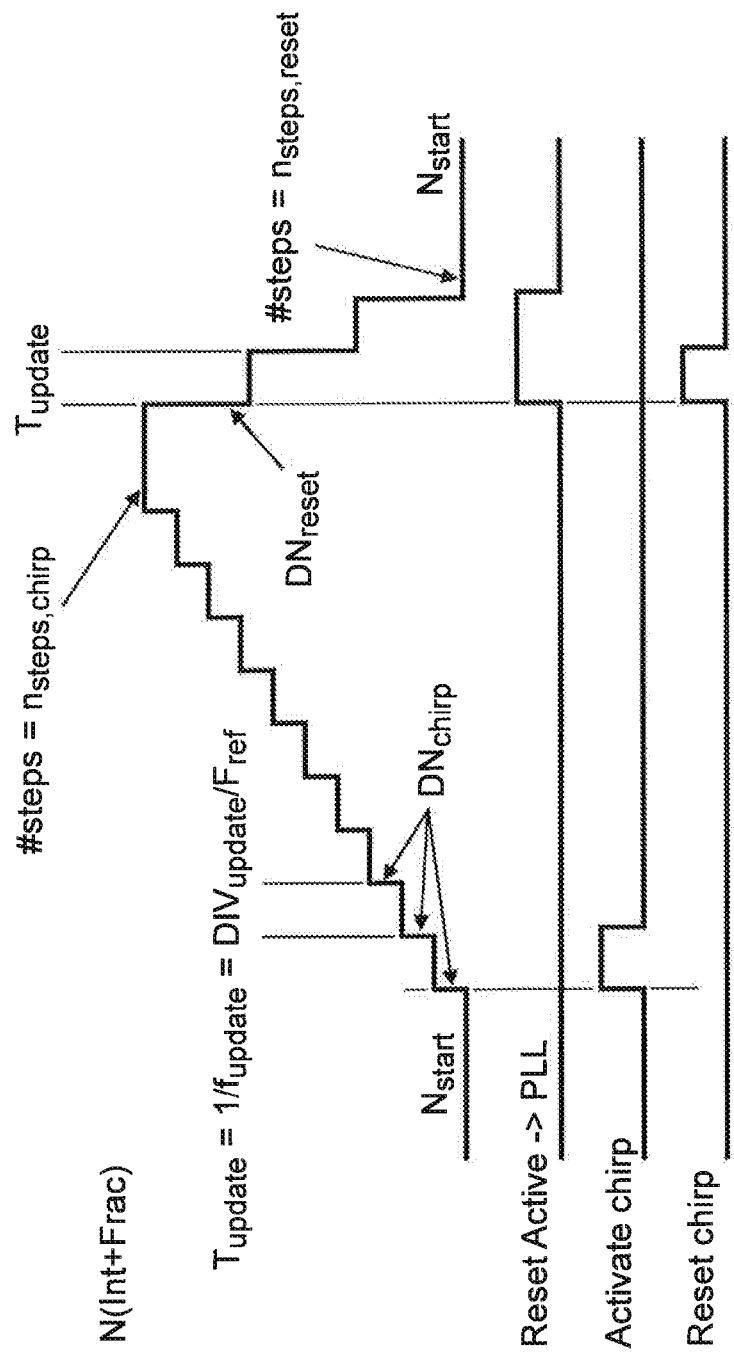
FIG. 10 depicts a timing diagram of the sweep-control block operation.

The Sequencer 10 may be implemented as a state-machine comprising a number of counters, namely
CNchirp: number of chirps
CNADC: number of ADC samples
CTchirp: Chirp timer After a Power-on reset operation, the registers content of the is set to binary 0, and the Sequencer 10 enters into an Idle state. In this state, all the signals outputted by the sequencer 10 and shown in FIG. 10 are set to logic state zero. When it is in the Idle state, the Sequencer 10 monitors the state of the Control register 30 until a "trigger code" e.g. bit 0 of the word stored in the control register 30 is set to logic 1. Then a sequence of measurement chirps starts, with the "Number of Chirps" $CN_{chirp}$ counter being reset and the "Chirp sequence active" signal being activated, disabling the power-down settings stored in the Idle state register 95.

Figure 7:
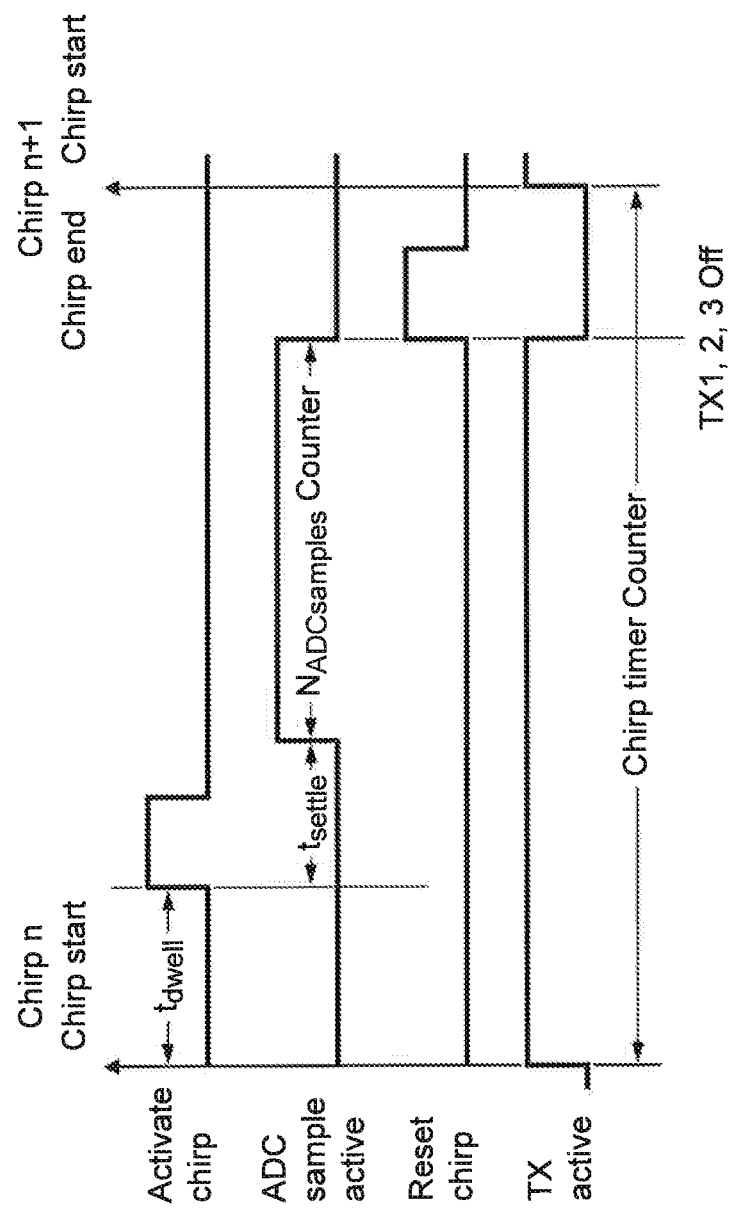
FIG. 7 depicts timing signals generated by the sequencer, according to another aspect of the application.

The counters in the Sequencer are reset when the system is going out of the Idle state. Then the sequence of active chirps starts, as depicted in FIG. 5. The output signals of the sequencer are shown in FIG. 7, and their relationship to the timing parameters are as previously described.

The functional sequence is described in the following paragraphs.

At the start of each chirp, the Chirp counter $CT_{chirp}$ is reset, and the settings for the Phase control bits and On/Off TXs are activated, by means of "TX active" signal which is set to logical 1. This signal is gated with the content of the timing engine 1 registers as depicted in FIG. 6. Additionally, the states of the Control register 30, Data Acquisition register 90 and the registers Odd, Even and 3-rd are latched within the sequencer 10 and Shadow register 80. If it is detected that the "trigger code" e.g. bit 0 of the word stored in the control register 30 has been removed during the preceding chirp, the measurement sequence operation stops and the timing engine goes into the Idle state.

When the Chirp counter $CT_{chirp}$ reaches the value set by the $t_{dwell}$ parameter, the "Activate chirp" signal is activated for a period of time e.g. 1 μs, triggering the frequency chirp at the sweep control block 2 and at the PLL 3. As the chirp counter $CT_{chirp}$ reaches the value $t_{dwell}+t_{settle}$, the ADC is activated. At the same time, the $CN_{ADC}$ ADC samples counter is enabled.

The $CN_{ADC}$ counter increases its content until it reaches the value as in the Data Acquisition register. At that moment five operations take place:

A.—the ADC is stops sampling the signals,
B.—the Reset chirp signal is sent to the Sweep Control block 2, and stays active for a period of e.g. 1 μs,
C.—the TXs are "deactivated", by resetting the "TX active" signal,
D.—the $CN_{ADC}$ counter is reset,
E.—the pointer for the registers Odd/Even/$3^{rd}$ is updated for the following chirp in the sequence, in accordance with the operation mode programmed in the Control register 30.

The chirp timer counter $CT_{chirp}$ continues its count until it reaches the value set by the $T_{chirp}$ parameter. At that moment the "end-of-chirp" time is reached, and the "Number of Chirps" $CN_{chirp}$ counter is increased and compared with the number of chirps parameter programmed in the Data Acquisition Register 90. If it is smaller than the programmed value the next chirp starts and the sequence repeats.

If "Number of Chirps" $CN_{chirp}$ counter value equals the $N_{chirp}$ target the data acquisition cycle is completed, and the "Ready INTerrupt" signal is activated for a period of e.g. 10 μs, and the timing engine 1 enters into the Idle mode.

The sequencer 10/timing engine 1 stays in the Idle mode until a new measurement cycle is triggered by writing the appropriate code into the Control register 30.

Figure 9:
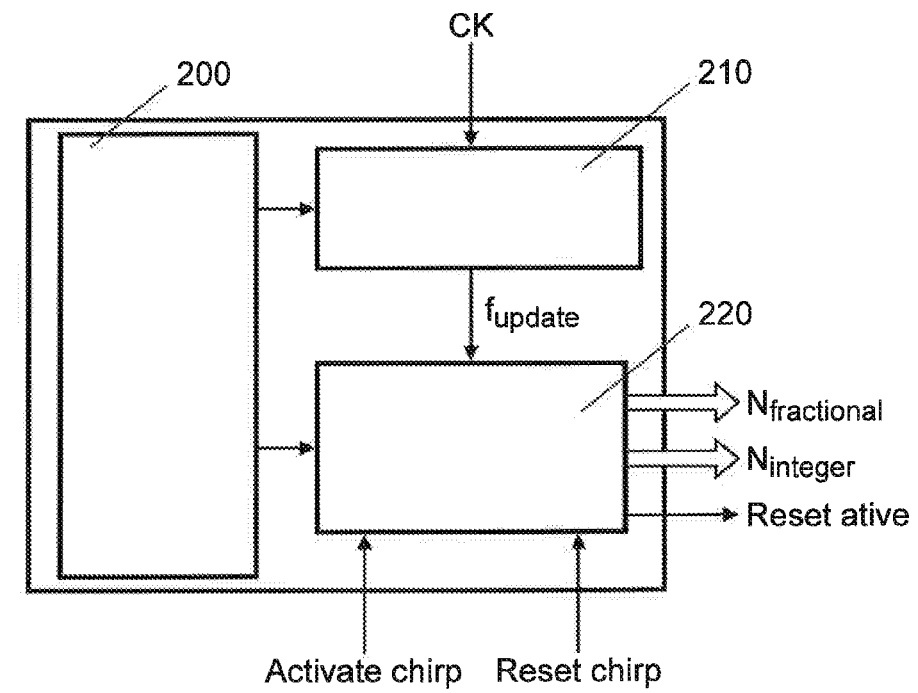
FIG. 9 depicts an embodiment of a sweep control block.

FIG. 9 depicts an embodiment of a sweep control block or unit 2. The sweep control unit 2 comprises a plurality of registers adapted to be loaded via the SPI bus, a frequency divider controlled by a first register from the plurality of registers. It further comprises a circuitry implementing a state—machine which is controlled by the control signals from the timing engine 1 the signals indicating a start time of a chirp and a reset time for resetting the sweep control unit 2, the sweep control unit 2 generating the control signals which controls the Phase Locked Loop (PLL) 3.

Figure 12:
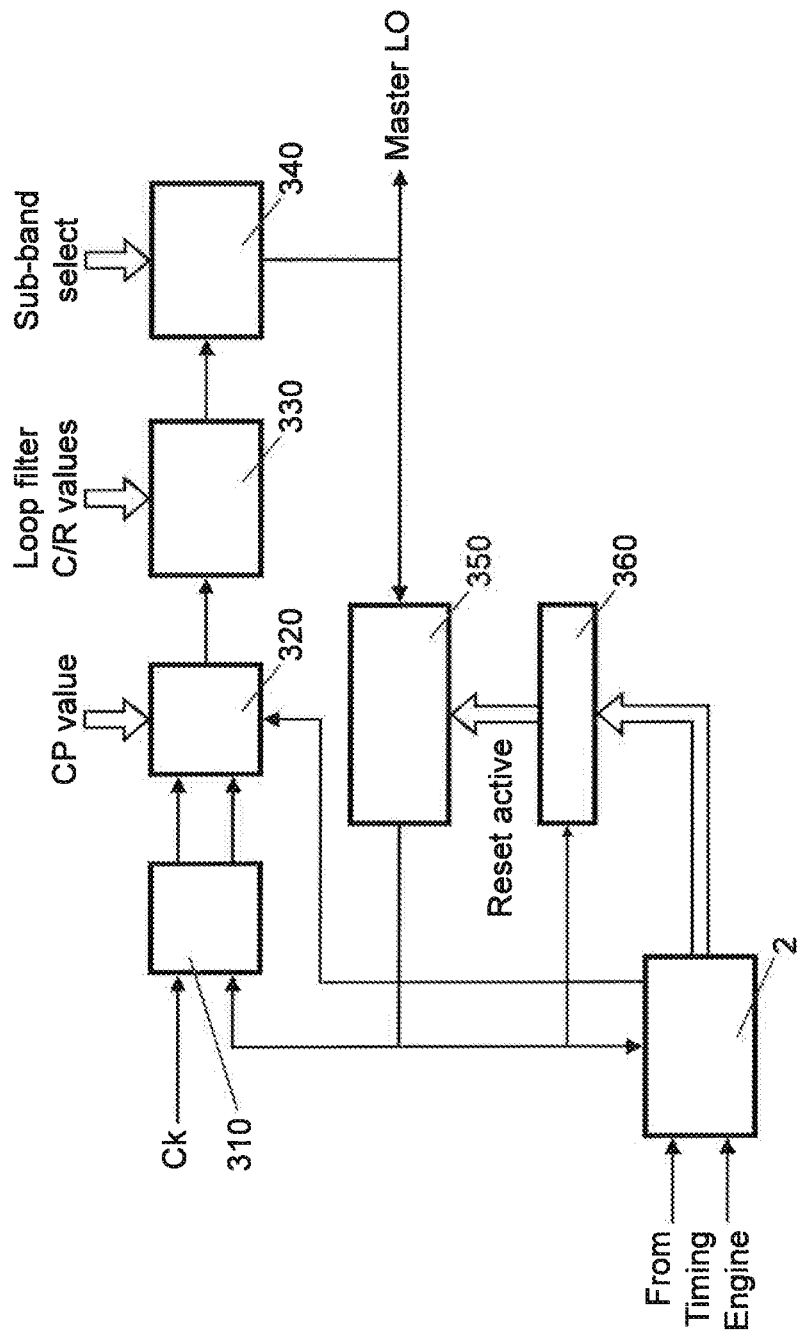
FIG. 12 depicts chirp generation bloc.

The Sweep Control unit 2 responds to the Activate chirp and Reset chirp signals coming from the Timing engine 1. It generates a sequence of division values consisting of an integer and a fractional part that are applied to the input of the sigma-delta modulator 360 within the PLL as it is shown in FIG. 12. It may also output a Reset active signal which is applied to the PLL and which can be used, for example, to broaden the loop bandwidth in chirp-reset mode.

The unit comprises SPI programmable registers, a frequency divider and a state-machine implementation. The registers represent the chirp start frequency, the slope of the frequency changes in data acquisition and reset modes, and the number of steps in data acquisition and reset modes. As an example, the input reference clock Ck frequency applied to the Sweep control unit 2 is 480 MHz and it is applied to a programmable frequency divider 210 to generate an internal frequency $f_{update}$ for the state-machine circuitry 220. As an example, the nominal value for the divider may be 6 with an $f_{update}=80$ MHz.

Figure 11:
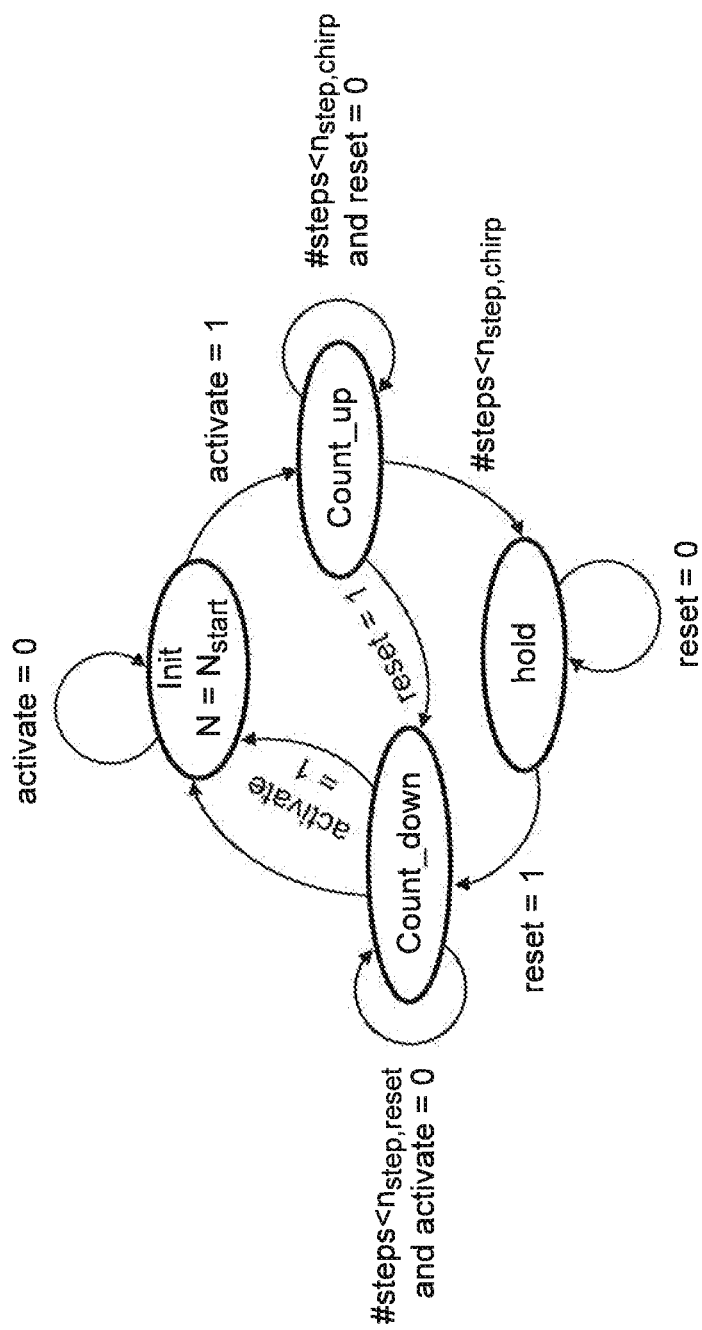
FIG. 11 depicts a state-diagram of the sweep-control block state machine during operation.

The overall frequency chirp is split into a series of incremental frequency steps, starting from a start-frequency parameter $N_{start}$ which is the start-value for the fractional PLL division ratio corresponding to the desired start frequency. The sequence of events is depicted in FIG. 10, and a state-machine representation is shown in FIG. 11.

Initially, the system is in an Init state. After receiving an Activate chirp signal, the state changes into a Count_up state. The size of the incremental frequency step in data acquisition mode is set by $DN_{chirp}$, while the update rate of the incremental steps is determined by $f_{update}$. These two parameters determine the slope of the frequency chirp, which can be either positive or negative depending on the sign of $DN_{chirp}$. The system remains in the Count_up state until the #steps in the counter reach the value of the parameter $n_{steps,chirp}$. After that the system changes its state into a hold state. If chirp reset signal becomes active before $n_{steps,chirp}$ is reached, then the system changes its state into a Count_down state and the hold state is skipped.

It is observed that the number of incremental frequency steps $n_{steps,chirp}$ is proportional with $N_{start}+DN_{chirp} \times n_{steps,chirp}$ and controls the stop frequency of the chirp. After the number of steps in data acquisition modes reaches $n_{steps,chirp}$ the system changes the state into the hold state and the output value remains constant until the reset chirp signal from the timing engine 1 arrives. Then the system changes the state into Count_down state, which is in fact the chirp reset operation, and the Reset Active signal becomes active.

In "chirp reset" mode i.e. count_down state, another register containing the frequency step parameter $DN_{reset}$ is read, and the output value of the sweep-control block is decremented, or incremented if a negative slope is read, for a number of steps set in register $n_{steps,reset}$.

After the number of steps in reset mode is reached the system leaves the Count_down state and move into Init state, while waiting for the Activate chirp signal to arrive again. It is possible that the Activate chirp arrives before $n_{steps,reset}$ is reached. In this situation the system leaves the Count down state and moves towards the Init state where the intermediate counters are reset, and immediately move into Count_up state.

FIG. 12 depicts chirp generation bloc.

The PLL 3 comprises a phase-frequency detector 310 coupled to a charge pump 320, the charge pump 320 being coupled to a loop filter 330, the loop filter 330 being further coupled to a voltage-controlled oscillator 340. The voltage controlled oscillator is adapted to generate the local oscillator signal LO. The voltage controlled oscillator is coupled to a divider 350 which is controlled by the control signals generated sweep control unit 2 via a Sigma-Delta modulator 360. A control register, not shown in the picture, is adapted to be updated via an SPI bus. The control register is adapted to control parameters of the charge pump 320, loop filter 330 and the voltage control oscillator 340.

The control register provides loop parameters for controlling the charge pump currents, as well as the value of the loop filter resistors and capacitors.

Furthermore, the charge pump 320 is adapted to receive a further control signal Reset Active generated by the sweep control unit 2 for increasing a loop bandwidth during a reset operation.

It is remarked that the scope of protection of the invention is not restricted to the embodiments described herein. Neither is the scope of protection of the invention restricted by

The invention claimed is:

1. A radar transceiver comprising:
   a set of transmitters for transmitting radar chirps to targets,
   a set of receivers for receiving reflected chirps from the targets,
   a timing engine processor coupled to the set of transmitters and to the set of receivers and configured to transmit a first set of control signals to the set of transmitters and to the set of receivers, the timing engine processor being further coupled to a computing unit, the timing engine processor configured to receive a second set of control signals generated by the computing unit and transmitted via a bus, and
   a sweep control processor coupled to the timing engine processor and configured to receive a first control signal and a second control signal from the timing engine processor, the first control signal indicating a start time of a chirp and the second control signal indicating a reset time for resetting the chirp, the sweep control processor being further coupled to a controlled phase locked loop (PLL); wherein the PLL is configured to generate and output a local oscillator signal to of the set of transmitters and each of the set of receivers, wherein the local oscillator signal is generated based on a control signal, the control signal is generated by the sweep control processor based on the first control signal and the second control signal.

2. A radar transceiver as claimed in claim 1, wherein each receiver included in the set of receivers comprises an analog to digital converter coupled to a serializer and configured to digitize the reflected chirps and to send digitized reflected chirps serially, each receiver being activated for period of time determined by a signal generated by the timing engine processor under the control of another signal generated by the timing engine processor.

3. A radar transceiver as claimed in claim 1, wherein the timing engine processor comprises:
   an interface configured to receive the second set of control signals transmitted by the computing unit; and
   a control register configured to store the second set of control signals and to transmit the stored second set of control signals to a sequencer.

4. A radar transceiver as claimed in claim 3, wherein the timing engine processor further comprises:
   a first register, a second register and a third register coupled to a multiplexer circuit, each register comprising a register content, the register content comprising parameter settings for selected chirps that are generated by the set of transmitters,
   the multiplexer circuit being controlled by a signal generated by the sequencer for selecting which of the first, second or third register content is transmitted.

5. A radar transceiver as claimed in claim 4, wherein the timing engine processor further comprises a fourth register configured to load the register content outputted by the multiplexer circuit (MUX) for preventing accidental transmission of chirp parameters.

6. A radar transceiver as claimed in claim 3, wherein the sequencer comprises a first counter, a second counter and a third counter, each counter being configured to be reset, or to increment their content under the control of the third counter.

7. A radar transceiver as claimed in claim 1, wherein the sweep control processor comprises:
   a plurality of registers configured to be loaded via a bus,
      a frequency divider controlled by a first register from the plurality of registers;
      a circuitry implementing a state—machine which is controlled by the control signals transmitted by the timing engine processor, the signals indicating a start time of a chirp and a reset time for resetting the sweep control processor;
   the sweep control processor generating control signals that control the PLL.

8. A radar transceiver as claimed in claim 7, wherein the sweep control processor is configured to generate a further control signal, the further control signal being configured to be inputted into the PLL for increasing a loop bandwidth during a reset operation.

9. A radar transceiver as claimed in claim 1, wherein the PLL comprises:
   a phase-frequency detector coupled to a charge pump, the charge pump being coupled to a loop filter, the loop filter being further coupled to a voltage-controlled oscillator, the voltage controlled oscillator configured to generate the local oscillator signal, the voltage control-oscillator being coupled to a divider which is controlled control signals generated by the sweep control processor, and
   a control register configured to be updated via a serial peripheral interface (SPI) bus, the control register configured to control parameters of the charge pump, loop filter and voltage control oscillator.

10. A method for transmitting and receiving radar signals comprising:
    transmitting chirps to a set of transmitters for transmitting them to targets,
    receiving reflected chirps from the targets by a set of receivers;
    transmitting a first set of control signals generated by a timing engine processor coupled to the set of transmitters and to the set of receivers, the timing engine processor receives a second set of control signals information via a bus;
    receiving a third set of control signals from the timing engine processor by a sweep control processor, the control signals indicating a precise start time of a chirp and a precise reset time for resetting the chirp; and
    generating a local oscillator signal by a controlled phase locked loop (PLL) coupled to the sweep control processor, wherein the local oscillator signal is generated based on a control signal, the control signal is generated by the sweep control processor based on the precise start time and the precise reset time.

11. A method for transmitting and receiving radar signals as claimed in claim 10, further comprising:
    analog to digital converting and serializing of the reflected chirps by any receiver in the set of receivers, and
    activating each receiver in the set of receivers by a signal generated by the timing engine processor for a period of time determined by another signal generated by the timing engine processor.

12. A method for transmitting and receiving radar signals as claimed in claim 10, further comprising:

receiving by the timing engine processor the second set of control signals transmitted by the computing unit and loading the second set of control signals in a dedicated register;

transferring the second set of control signals in a control register;

transmitting the second set of control signals from the control register to a sequencer; and generating the third set of control signals by the sequencer for controlling the sweep control processor.

13. A method for transmitting and receiving radar signals as claimed in claim 12, further comprising:

loading chirp parameters settings in a first register, in a second register and in a third register, the registers being coupled to a multiplexer circuit, and included in the timing engine processor, and controlling the multiplexer circuit by a signal generated by the sequencer for selecting which of the chirp parameters settings are transmitted.

* * * * *